L. STEVENS.
FRUIT PICKER.
APPLICATION FILED SEPT. 11, 1912.
1,094,263.
Patented Apr. 21, 1914.
2 SHEETS—SHEET 1.
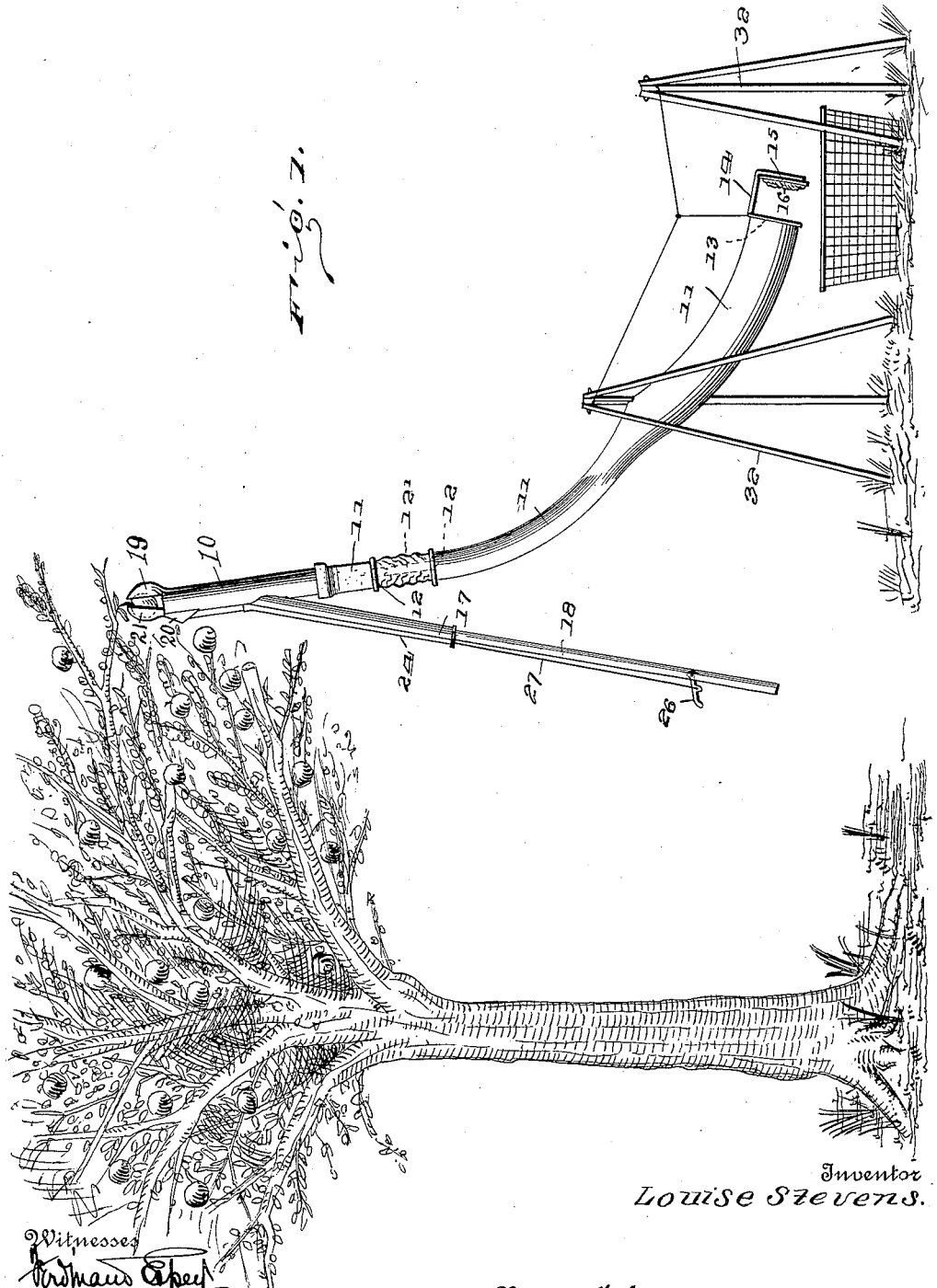
Inventor
Louise Stevens.

L. STEVENS.
FRUIT PICKER.
APPLICATION FILED SEPT. 11, 1912.
1,094,263.
Patented Apr. 21, 1914.
2 SHEETS—SHEET 2.
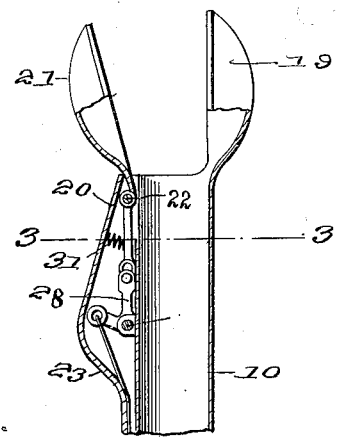
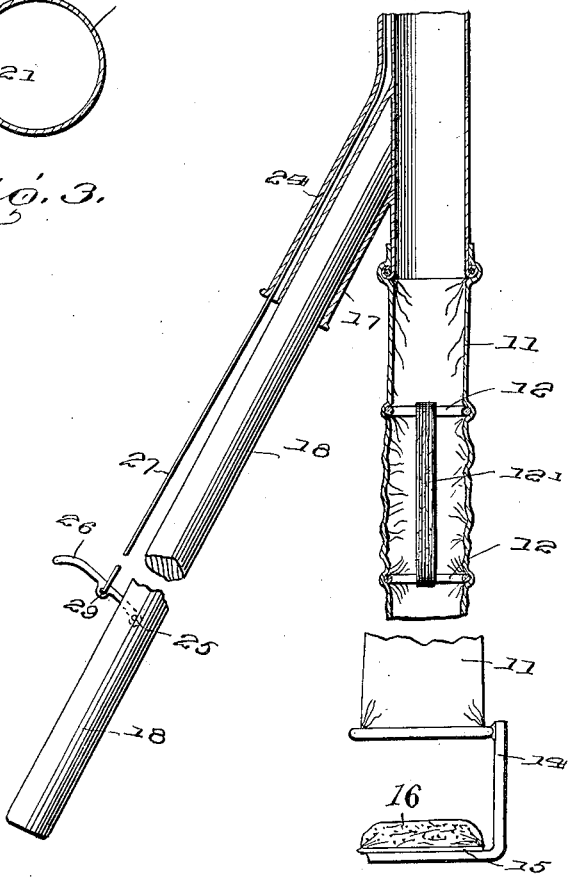

UNITED STATES PATENT OFFICE.

LOUISE STEVENS, OF RAINBOW LAKE, NEW YORK.

FRUIT-PICKER.

1,094,263.  Specification of Letters Patent.  Patented Apr. 21, 1914.

Application filed September 11, 1912.  Serial No. 719,850.

*To all whom it may concern:*

Be it known that I, LOUISE STEVENS, citizen of the United States, residing at Rainbow Lake, in the county of Franklin and State of New York, have invented certain new and useful Improvements in Fruit-Pickers, of which the following is a specification.

This invention relates to improvements in fruit pickers and has for one of its objects to improve the construction and increase the efficiency and utility in a device of this character.

Another object of the invention is to provide a simply constructed device whereby fruit may be gathered from otherwise inaccessible points and transferred to a suitable receptacle without injury to the fruit.

With these and other objects in view the invention consists in certain novel features of construction which will be hereinafter shown and described and then specifically pointed out in the claims, and in the drawing illustrative of the preferred embodiment of the invention.

Figure 1 is a side elevation of the improved device in operative position. Fig. 2 is an enlarged sectional detail illustrating the construction more fully. Fig. 3 is a transverse section on the line 3—3 of Fig. 1.

Corresponding and like parts are referred to in the following description and indicated in all the views of the drawings by the same reference characters.

The improved device comprises a tubular portion 10 sufficiently large to permit the largest fruit which it is designed to pick to pass and from the lower end of which a fabric tubular member 11 extends to any required distance. The fabric member is provided near its upper end with metal rings 12 spaced apart, and enlarged at its lower portion with a larger metal ring 13. The rings 12 are united by a plurality of elastic straps 12' which thus serve to yieldably connect the rings. Connected to the terminal ring 13 is a standard or arm 14 which terminates at its lower end some distance below the ring 13 and is provided with a laterally extending plate or disk 15 preferably of substantially the same diameter as the ring 13 and provided with a pad 16. The pad is spaced from the ring 13 a distance sufficient to permit the largest fruit to pass from the flexible tube. By this means the fruit in falling through the flexible tube is caught upon the pad 16 and prevented thereby from injury.

At its lower end the tube 10 is provided with a handle socket 17 to which a handle 18 of any suitable length is connected. The socket 17 is preferably extended obliquely to the longitudinal plane of the tubular member 10, as shown. At its upper end the tubular member is provided with a stationary jaw 19 preferably concaved or dish-shaped. Extending from the side of the tube 10 opposite to the stationary jaw 19, is a hollow projection 20 in which a movable jaw 21 is pivoted at 22. Connected to the member 10 below the projection 20 is a guard 23 which extends at one side of the tube 10, as shown at 24, the extension forming a continuation of the guard 23. At its lower end the extension 24 merges into and communicates with the exterior of the socket 17. Pivoted at 25 in the handle 18 is a lever-arm 26.

A pull-wire 27 is connected at one end to a bell crank 28 which is in turn coupled to the lower extended end of the jaw 21. The pull-wire passes through the guard 23 and guideway 24 and is connected at 29 to the lever-arm 26. A spring 31 is connected within the projection 20 and operates against the lower end of the jaw 21 to maintain the same yieldably and normally in open position. By this simple means it will be obvious that a simply constructed fruit picker is produced whereby otherwise inaccessible fruit may be engaged between the jaws 19 and 21 and the jaw 21 operated by manipulating the lever-arm 26 to cause the jaw 21 to close against the jaw 19 and thus sever the stem of the fruit or hold the fruit while being pulled from the tree, the severed fruit passing through the tube 10 and the flexible tubular member 11 and against the pad 16 and thence into a suitable receptacle, or in position to be removed manually from the pad.

The portion of the flexible tube between the rings 12 and held by the elastic members 12', is designed to take up slack, and will be found of advantage in the longer flexible tubes, as the portion of the tube below the rings may be extended to adapt it to the receptacle into which the fruit is discharged.

The tubular members 10 and 11 may be of any suitable length and the handle may likewise be of any suitable length to enable the device to be employed in connection with trees of various heights, and for fruit of various kinds. For peaches, pears and similar delicate and easily damaged fruit, shorter tubes will preferably be employed so that the fruit will not have so far to travel.

The tubular member 10 together with its socket 17 and jaws 19—21 will preferably be of metal while the tubular member 11 will preferably be of any suitable fabric. A plurality of supports 32 are preferably employed to support the fabric tube in position.

Having thus described my invention, what I claim is:—

1. In a fruit picker, a rigid tubular member having a stationary jaw at one side and a hollow projection at the opposite side, a movable jaw mounted for movement within said hollow projection, means within said hollow projection for actuating said movable jaw, a handle socket extending from said tubular member, a guide externally of said socket and communicating with the hollow projection, a handle connected to said socket, a pull device connected to said movable jaw and extending through said guide, and a pull device actuating means connected to said handle.

2. In a fruit picker, a rigid tubular member having a stationary jaw at one end and a hollow projection at the side opposite to the stationary jaw, a movable jaw pivoted at its lower end within said hollow projection, means within said hollow projection for actuating said movable jaw, a handle socket extending obliquely from said tubular member at one side, a guide extending externally of said handle socket and communicating with said hollow projection, a handle within said handle socket, a lever carried by said handle, and a pull device connected between said lever and said movable jaw operating means and extending through said guide.

In testimony whereof I affix my signature in presence of two witnesses.

MRS. LOUISE STEVENS. [L. S.]

Witnesses:
 CHARLES STEVENS,
 GEORGE RILEY.

---

Copies of this patent may be obtained for five cents each, by addressing the "Commissioner of Patents, Washington, D. C."